United States Patent
Hamstra et al.

(10) Patent No.: US 8,408,281 B2
(45) Date of Patent: Apr. 2, 2013

(54) SYSTEM, METHOD, AND APPARATUS FOR PULSED-JET-ENHANCED HEAT EXCHANGER

(75) Inventors: Jeffrey W. Hamstra, Fort Worth, TX (US); Daniel N. Miller, Bainbridge Island, WA (US); Kerry B. Ginn, Weatherford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1569 days.

(21) Appl. No.: 11/872,165

(22) Filed: Oct. 15, 2007

(65) Prior Publication Data

US 2009/0095446 A1    Apr. 16, 2009

(51) Int. Cl.
*F28F 13/12* (2006.01)
*B64D 33/10* (2006.01)

(52) U.S. Cl. ......... 165/44; 165/96; 165/109.1; 165/123; 244/57

(58) Field of Classification Search ..................... 244/57
See application file for complete search history.

(56) References Cited

U.S. PATENT DOCUMENTS

| | | | | |
|---|---|---|---|---|
| 1,412,073 A * | 4/1922 | Wagenseil | ................... | 244/57 |
| 2,168,166 A * | 8/1939 | Larrecq | ................... | 244/57 |
| 2,171,047 A * | 8/1939 | Richardson et al. | ................... | 244/57 |
| 2,271,131 A * | 1/1942 | Price | ................... | 165/44 |
| 2,352,144 A * | 6/1944 | Woods | ................... | 244/57 |
| 3,968,653 A * | 7/1976 | Cachera | ................... | 376/298 |
| 4,367,789 A * | 1/1983 | Moranne | ................... | 165/76 |
| 4,581,887 A * | 4/1986 | Scheffler et al. | ................... | 165/109.1 |
| 4,741,385 A | 5/1988 | Bergles et al. | | |
| 4,750,552 A * | 6/1988 | Lanquist et al. | ................... | 165/123 |
| 4,756,279 A * | 7/1988 | Temmesfeld | ................... | 123/41.04 |
| 5,181,554 A * | 1/1993 | Mita | ................... | 165/123 |
| 5,190,099 A | 3/1993 | Mon | | |
| 5,323,624 A * | 6/1994 | Schwalm | ................... | 62/401 |
| 5,329,994 A | 7/1994 | Collings et al. | | |
| 5,397,217 A * | 3/1995 | DeMarche et al. | ................... | 416/97 R |
| 5,511,385 A * | 4/1996 | Drew et al. | ................... | 62/172 |
| 6,122,917 A | 9/2000 | Senior | | |
| 6,308,740 B1 | 10/2001 | Smith et al. | | |
| 6,457,654 B1 | 10/2002 | Glezer et al. | | |
| 6,588,497 B1 | 7/2003 | Glezer et al. | | |
| 7,246,658 B2 * | 7/2007 | Wyatt et al. | ................... | 165/44 |
| 7,336,486 B2 * | 2/2008 | Mongia | ................... | 361/695 |
| 7,520,465 B2 * | 4/2009 | Mahjoub | ................... | 244/57 |
| 8,051,905 B2 * | 11/2011 | Arik et al. | ................... | 165/109.1 |
| 2005/0189092 A1 | 9/2005 | Jahn et al. | | |
| 2006/0196638 A1 * | 9/2006 | Glezer et al. | ................... | 165/80.3 |
| 2006/0207758 A1 * | 9/2006 | Elliot et al. | ................... | 165/202 |
| 2007/0023169 A1 | 2/2007 | Mahalingam et al. | | |

OTHER PUBLICATIONS

Mahalingam, Raghav, et al., An Actively Cooled Heat Sink Integrated with Synthetic Jets, Proceedings of NHTC 2001: 35th National Heat Transfer Conference, ASME, Jun. 2001, pp. 1-6.
Mahalingam, Raghav, et al., Design and Thermal Characteristics of a Synthetic Jet Ejector Heat Sink, ASME, Transactions of the ASME, Jun. 2005, vol. 127, pp. 172-177.
Garg, Jevtesh, et al., Mesco Scale Pulsating Jets for Electronics Cooling, ASME, Journal of Electronic Packaging, Dec. 2005, vol. 127, pp. 503-511.
Glezer, Ari, Thermal Management Technologies, AIAA Flow Control Short Course, American Institute of Aeronautics and Astronautics Fluid Dynamics Technical Committee, Nevada, Jan. 2006, pp. 1-43.
Pavlova, Anna, et al., Electronic Cooling Using Synthetic Jet Impingement, Rensselaer Polytechnic Institute, New York.

* cited by examiner

*Primary Examiner* — Leonard R Leo
(74) *Attorney, Agent, or Firm* — Bracewell & Giuilani LLP

(57) ABSTRACT

A pulsed-jet active flowfield control actuation system enhances the rate of heat transfer and heat removal in a heat exchanger for better management of thermal loads. The pulsed jet actuators impart an unsteady component of velocity to the working fluid of the heat exchanger. This design increases the convective heat transfer, and avoids increases in heat exchanger volume and weight for a given performance value.

21 Claims, 6 Drawing Sheets

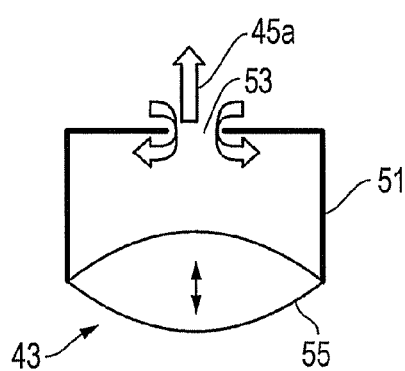 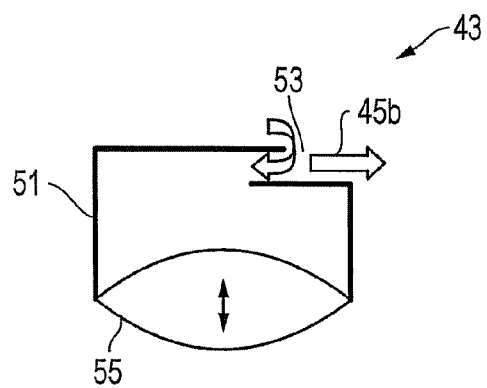
*FIG. 3A*  *FIG. 3B*
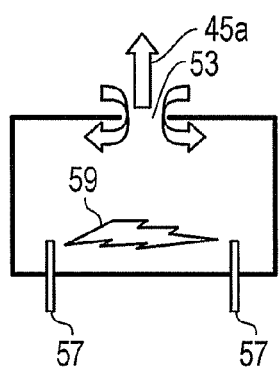 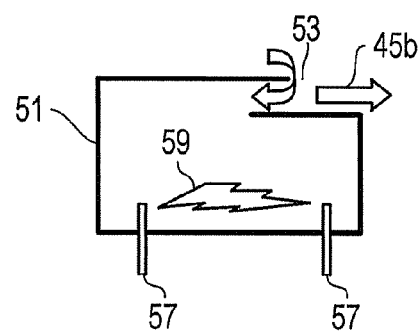
*FIG. 4A*  *FIG. 4B*

SYSTEM, METHOD, AND APPARATUS FOR PULSED-JET-ENHANCED HEAT EXCHANGER

BACKGROUND OF THE INVENTION

1. Technical Field

The present invention relates in general to heat exchangers and, in particular, to an improved system, method, and apparatus for pulsed-jet-enhanced heat exchangers.

2. Description of the Related Art

Emerging and next-generation air vehicles will be required to manage unprecedented quantities of thermal, mechanical, and electrical power. This need arises from the demands for advanced propulsion, aerodynamics, sensor, and weapon/payload capability necessary to defeat threats, perform with greater fuel efficiency, reduce noise and emissions, and decrease life cycle cost. Specific technologies of interest, such as advanced engines, high power sensors, directed energy weapons, and enhanced electronic actuation, will require much more power than today's systems. While demand for power management functionality grows, the space and weight available for such capability continues to shrink. Since heat transfer systems (i.e., heat exchangers) are a critical element of power management, this capability must also improve. However, advancement of heat exchanger technology is not keeping up with demand.

At least three methods have been used to increase the rate of heat removal from heat exchangers. One method is simply to physically increase or scale the size of the heat exchanger to increase its wall surface area. Another method is to use materials that have greater thermal conductivity to allow more heat to pass through the heat exchanger for a given temperature difference. A third method characterizes the state-of-the-art, which is to use micro channel technology to configure a given volume of heat exchanger with more surface area without increasing its overall size. Although each of these solutions is workable, an improved solution that overcomes the limitations of the prior art and which meets the current and future design challenges is needed.

SUMMARY OF THE INVENTION

Embodiments of a system, method, and apparatus for rapidly enhancing the rate of heat transfer and removal in a heat exchanger used to manage thermal loads are disclosed. The invention increases the rate of heat transfer with a pulsed-jet-based active flowfield control actuation system that boosts the convective heat transfer coefficient. The pulsed-jet actuators are used to impart an unsteady or pulsatile component of velocity to the working fluid of the heat exchanger. This design transiently increases (1) the wall spatial velocity gradient $\Delta U/\Delta Y$, and (2) the temporal velocity gradient $\Delta U/\Delta t$, both of which are related to the rate of convective heat transfer. Methods such as those disclosed herein that impose transients to the working fluid increase the rate of heat transfer. This invention is suitable for many different applications including, for example, air vehicles, automobiles, missiles, electronics, HVAC, commercial, etc.

The pulsed-jet heat exchanger increases the convective heat transfer efficiency (i.e., related to thermal efficiency) without the need to increase the heat exchanger surface area design parameter which can increase fluid pressure loss, as well as heat exchanger volume and weight. In addition, pulsed-jet heat exchangers increase the rate of both impingement-based and tangential components of convective cooling. For example, in one embodiment, the average heat transfer coefficient in a heat sink is 2.5 times greater with a pulsed-jet actuation source than with a steady flow at the same Reynolds number. The invention enables designers such as systems integrators to utilize more substantial heat management capability in a given weight or volume. Conversely, the invention significantly reduces the weight and volume required for a given heat exchanger capacity.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

FIGS. 3A and 3B are sectional views of one type of pulsed-jet actuator utilized by the system of FIG. 2;

FIGS. 4A and 4B are sectional views of another type of pulsed-jet actuator utilized by the system of FIG. 2;

DETAILED DESCRIPTION OF THE INVENTION

Figure 1:
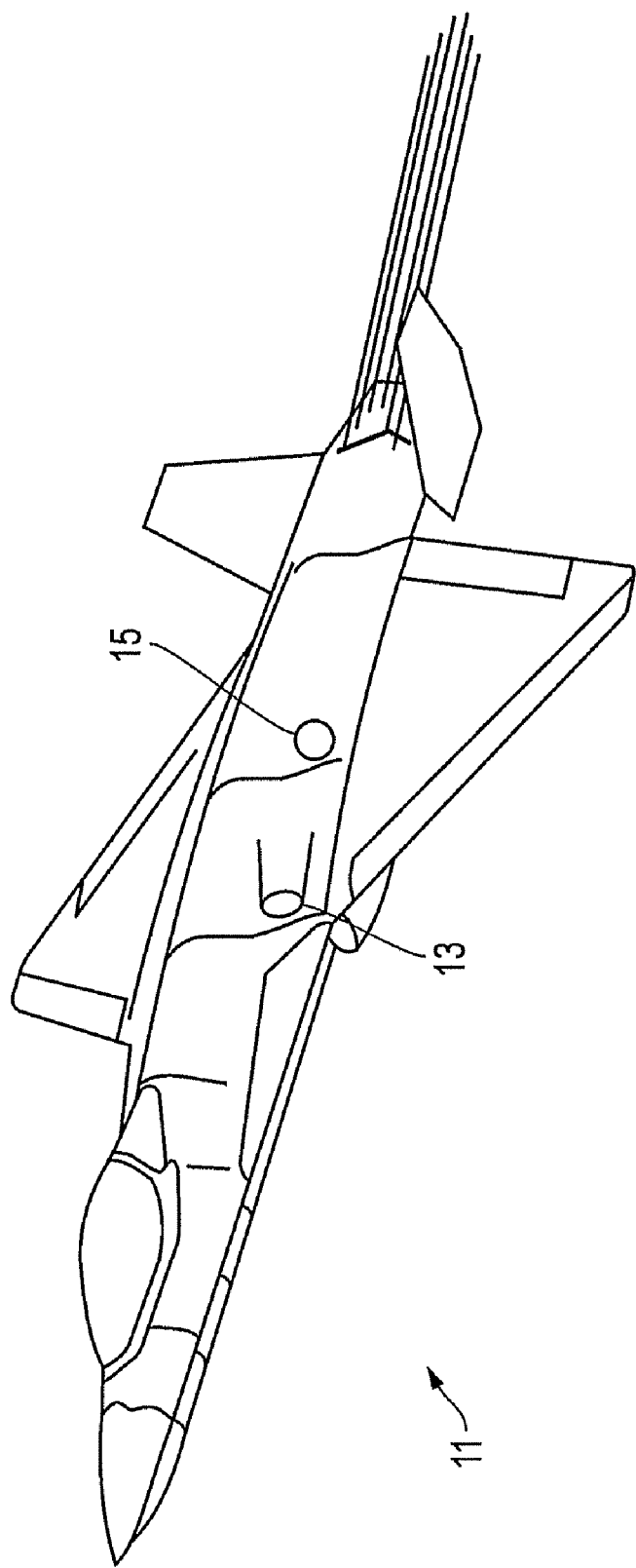
FIG. 1 is an isometric view of one embodiment of an aircraft constructed in accordance with the invention.

Referring to FIGS. 1-7, embodiments of a system, method and apparatus for managing thermal loads are disclosed. The invention is well suited for use in conjunction with heat exchangers to improve the performance thereof. For example, as shown in FIG. 1, the invention may be incorporated into other systems, such as an aircraft 11. In the embodiment shown, aircraft 11 is provided with an inlet 13 and an outlet 15, such as a flush screened exit.

Figure 2:
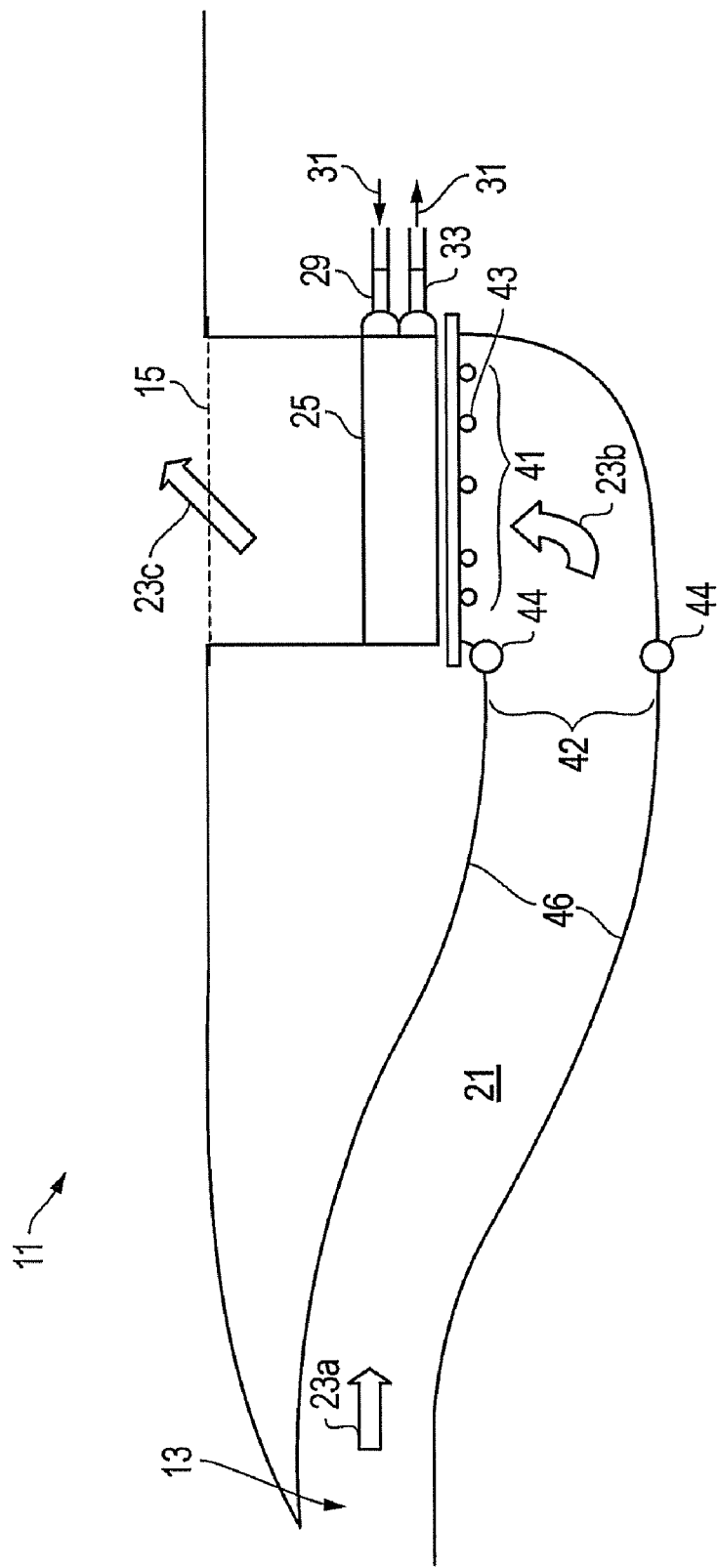
FIG. 2 is a schematic sectional view of one embodiment of a heat management system for the aircraft of FIG. 1 and is constructed in accordance with the invention.

Referring now to FIG. 2, a passage 21 is formed in the aircraft 11 for directing a first working fluid 23 (e.g., ram air) therethrough. The passage 21 of the illustrated embodiment extends between the ram air inlet 13 for ingress of the first working fluid 23 and the flush screened exit 15 for egress of the first working fluid 23.

A heat exchanger 25 is mounted in the passage 21 as shown, and may be configured such that all of the flow of first working fluid 23 passes therethrough. The heat exchanger 25 has a conduit 27 (see, e.g., FIG. 6) with an inlet port 29 for communicating a second working fluid 31 (e.g., liquid jet fuel) into the heat exchanger 25. An outlet port 33 communicates the second working fluid 31 out of the heat exchanger 25. A fluid conducting path (e.g., conduit 27) extends from the inlet port 29 to the outlet port 33 for directing the second working fluid 31 through the heat exchanger 25. The heat exchanger also may comprise a plurality of fins 35 (see, e.g., FIGS. 6 and 7) for transferring heat from the conduit 27. The fins 35 may be configured to align in a direction of flow of the first working fluid 23.

Referring now to FIGS. 2-7, the invention also comprises various embodiments of pulsed excitation devices, such as zero mass flux jet actuators or pulsed-jet arrays. For example, as shown in FIG. 2 an array 41 of pulsed-jets 43 may be mounted in the passage 23 upstream from the heat exchanger 25. In addition, the pulsed-jet arrays 41 may be mounted to an inlet surface (see, e.g., FIG. 7) upstream of the heat exchanger 25, or in an interior thereof (see, e.g., FIG. 6) such as between the conduit 27 and fins 35. In another embodiment, an array 42 of pulsed-jets 44 may be mounted to a sidewall 46 of the passage 21.

Each pulsed-jet actuator array may comprise a plurality of actuators 43 (see, e.g., FIGS. 3-6) for producing pulsed-jets 45 of the first working fluid that impart an unsteady component of velocity to the first working fluid. The pulsed-jets 45 may be directed at the heat exchanger 25 for rapidly enhancing a rate of heat transfer and removal in the heat exchanger.

Figure 6:
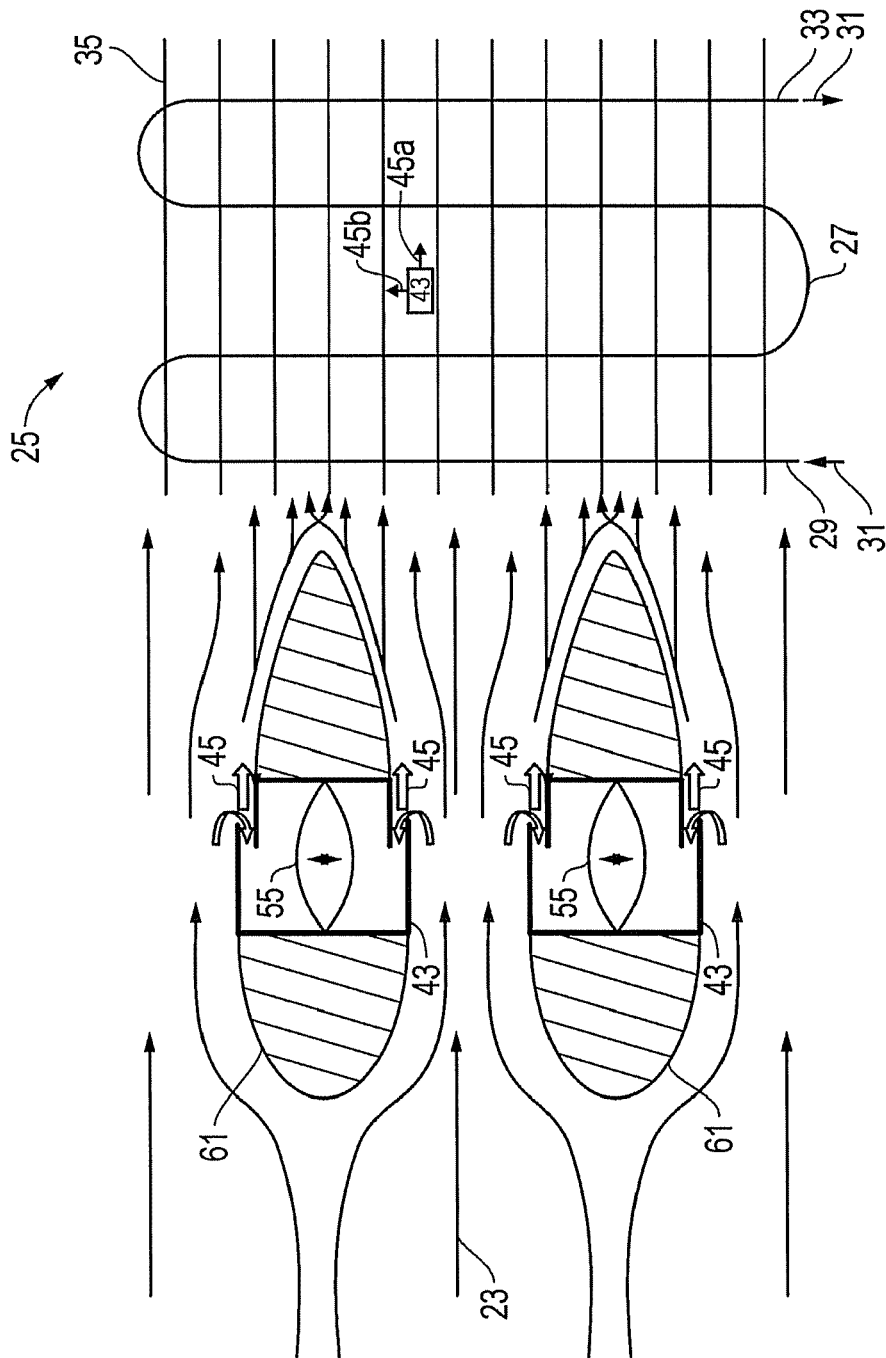
FIG. 6 is a sectional view of another embodiment of struts and pulsed-jet actuator constructed in accordance with the invention.
Figure 7:
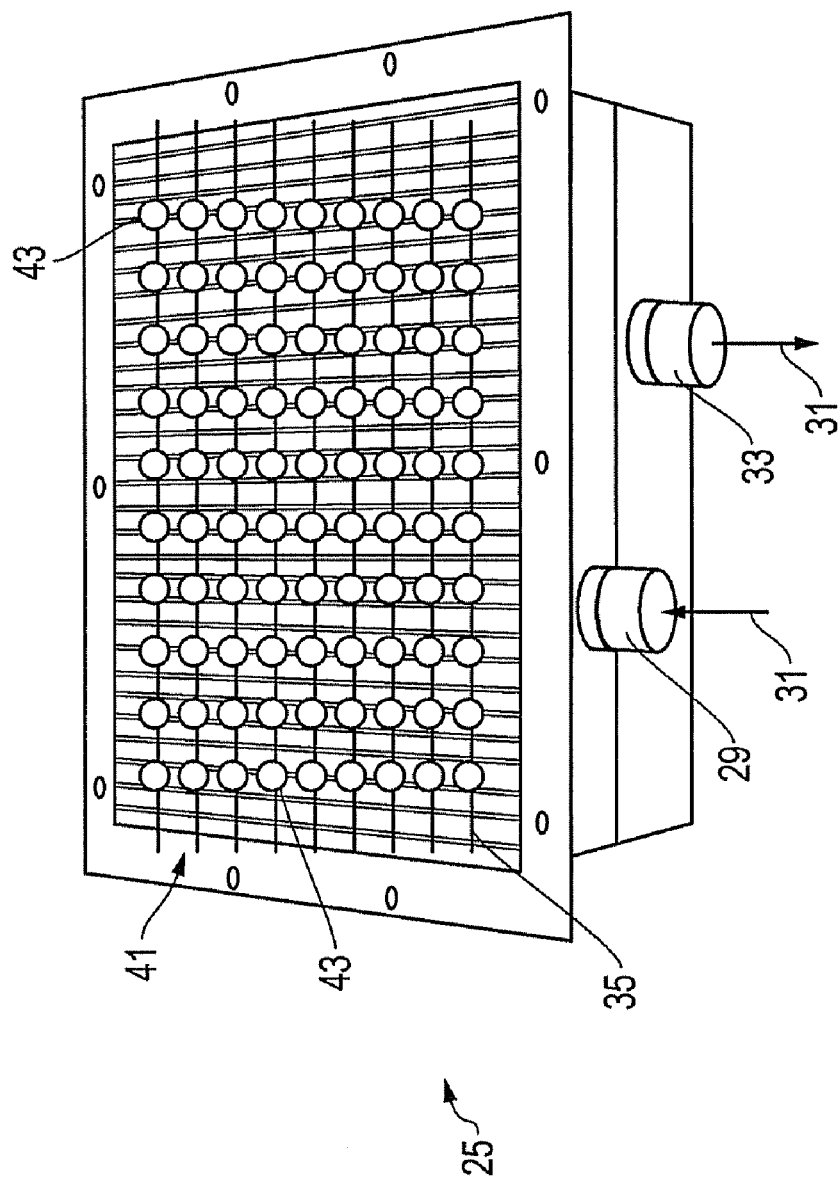
FIG. 7 is an isometric view of an embodiment of a heat exchanger configuration of pulsed-jets constructed in accordance with the invention.

As shown in FIGS. 3A, 4A, and 6, the pulsed-jets 45a may be emitted in a same direction of flow as the first working fluid 23. Alternatively (see, e.g., FIGS. 3B, 4B, and 6), the pulsed-jets 45b may be emitted in a direction that is perpendicular to a direction of flow of the first working fluid 23. Each of the pulsed-jets 43 may comprise an enclosure 51, an orifice 53 and a vibrating diaphragm 55 for moving the first working fluid into and out of the orifice 53 to produce the pulsed-jets 45. Alternatively (FIGS. 4A and 4B), the pulsed-jets maybe provided with enclosures 51, orifices 53 and electrodes 57 between which pass electric arcs 59 for forming the pulsed-jets of fluid.

The pulsed-jet arrays comprise active flowfield control actuation systems that increase a convective heat transfer coefficient of the heat exchanger 25. The pulsed-jet arrays transiently increase a wall spatial velocity gradient $\Delta U/\Delta Y$ of either or both of the working fluids, and a temporal velocity gradient $\Delta U/\Delta t$ of either or both of the working fluids. In one embodiment, the pulsed-jet arrays transiently increase a wall spatial velocity gradient $\Delta U/\Delta Y$ of the first working fluids, and a temporal velocity gradient $\Delta U/\Delta t$ of the first working fluid.

Figure 5:
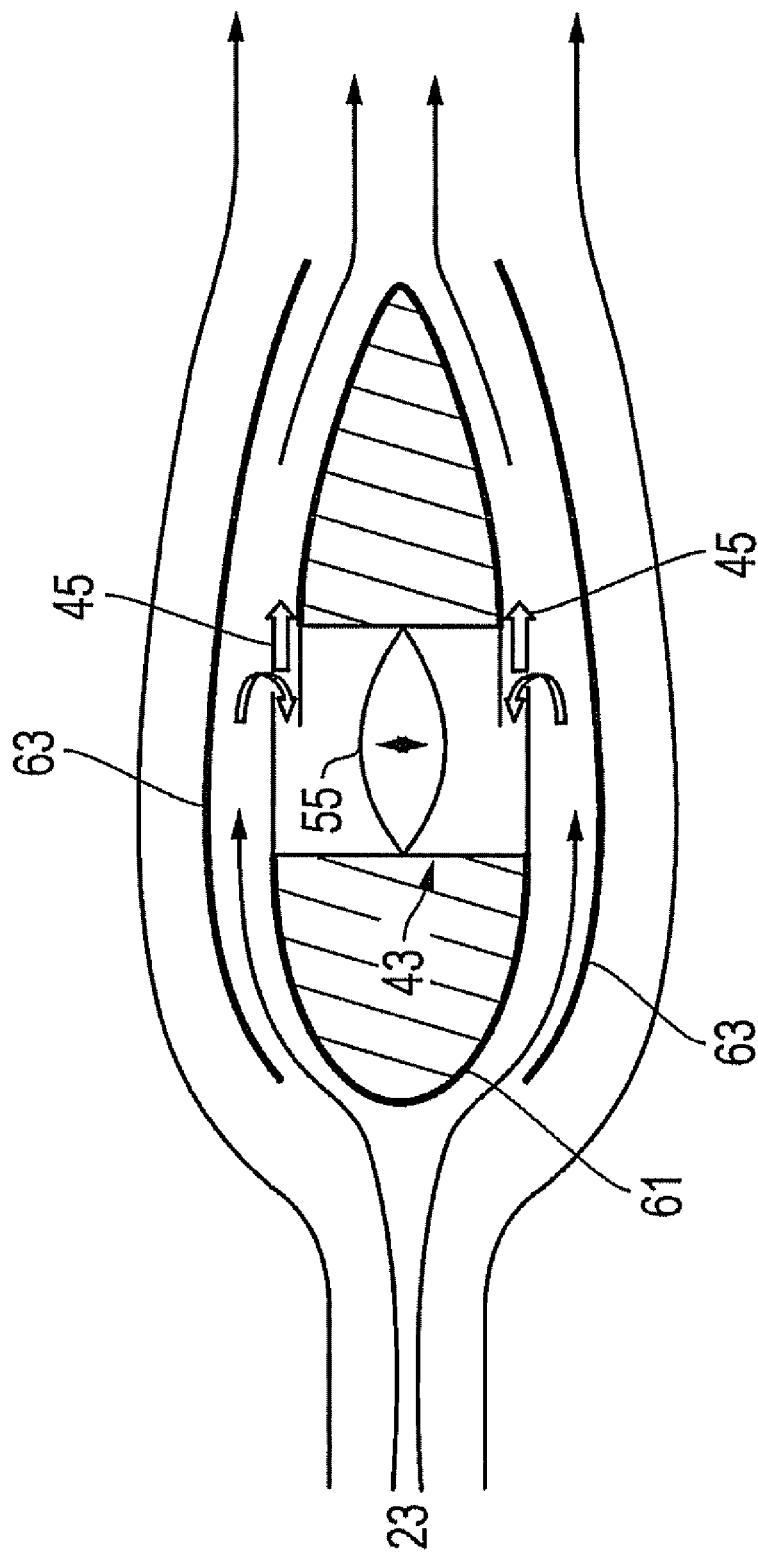
FIG. 5 is a sectional view of one embodiment of a pulsed ejector strut and pulsed-jet actuator constructed in accordance with the invention.

Referring now to FIGS. 5 and 6, the pulsed-jets 43 also may be mounted in struts 61 (e.g., aerodynamic members) that are located in the passage 21 to enhance fluid flow therethrough. As shown in FIG. 5, at least some of struts 61 may be configured as ejectors having inner strut housings 61 that contain the pulsed-jets 43, and outer strut housings 63 that are spaced apart from the inner strut housings 61 for permitting flow of the first working fluid 23 between the inner and outer strut housings 61, 63 to the pulsed-jets 43. In one embodiment, the pulsed-jets may comprise orifices having an opening size (e.g., diameter) of 0.1 to 1.0 inches.

While the invention has been shown or described in only some of its forms, it should be apparent to those skilled in the art that it is not so limited, but is susceptible to various changes without departing from the scope of the invention.

What is claimed is:

1. A system for boosting heat transfer capability of cooling air within an aircraft, comprising:
a passage adapted to be located in the aircraft for directing a flow of cooling air therethrough, the passage having an inlet for ingress of the cooling air and an exit for egress of the cooling air;
a heat exchanger mounted in the passage, the heat exchanger having a conduit with an inlet port for communicating fluid into the heat exchanger to be cooled by the cooling air, an outlet port for communicating the fluid out of the heat exchanger, and a path extending from the inlet port to the outlet port for directing the fluid through the heat exchanger, the heat exchanger also having a plurality of fins for transferring heat from the conduit to the cooling air, and the fins being aligned in a direction parallel to a flow of the cooling air; and
a pulsed-jet actuator mounted in the passage for producing pulsed-jets into the cooling air flowing through the passage, the pulsed-jets imparting an unsteady component of velocity to the cooling air flowing though the passage for enhancing a rate of heat transfer and removal in the heat exchanger; and
wherein the pulsed-jet actuator comprises a plurality of pulsed-jet actuators mounted to a grid on an upstream side of the heat exchanger.

2. A system according to claim 1, wherein the inlet of the passage comprises a ram air inlet that directs the cooling air into the passage based on a forward velocity of the aircraft.

3. A system according to claim 1, wherein the pulsed-jets are emitted in a same direction of flow as the cooling air.

4. A system according to claim 1, wherein the pulsed-jets are emitted in a direction that is perpendicular to a direction of flow of the cooling air.

5. A system according to claim 1, wherein the pulsed-jet actuator comprises an enclosure, an orifice, and a vibrating diaphragm for moving a portion of the cooling air into and out of the orifice to produce the pulsed-jets.

6. A system for boosting heat transfer capability of cooling air within an aircraft, comprising:
a passage adapted to be located in the aircraft for directing a flow of cooling air therethrough, the passage having an inlet for ingress of the cooling air and an exit for egress of the cooling air;
a heat exchanger mounted in the passage, the heat exchanger having a conduit with an inlet port for communicating fluid into the heat exchanger to be cooled by the cooling air, an outlet port for communicating the fluid out of the heat exchanger, and a path extending from the inlet port to the outlet port for directing the fluid through the heat exchanger, the heat exchanger also having a plurality of fins for transferring heat from the conduit to the cooling air, and the fins being aligned in a direction parallel to a flow of the cooling air;
a pulsed-jet actuator mounted in the passage for producing pulsed-jets into the cooling air flowing through the passage, the pulsed jets imparting an unsteady component of velocity to the cooling air flowing through the passage for enhancing a rate of heat transfer and removal in the heat exchanger;
a strut located in the passage and extending between sidewalls of the passage; and
wherein the pulsed-jet actuator is mounted to the strut between the sidewalls of the passage.

7. The system according to claim 6, wherein the strut is configured as an ejector having an inner strut housing that contains the pulsed-jet actuator, and an outer strut housing spaced apart from the inner strut housing for permitting flow of the cooling air between the inner and outer strut housings to the pulsed-jet actuator.

8. A system for boosting heat transfer capability of cooling air directed into an aircraft, comprising:
   a passage adapted to be located in the aircraft for directing cooling air therethrough, the passage having a ram air inlet for ingress of the cooling air in response to forward flight of the aircraft, and an exit for egress of the cooling air;
   a heat exchanger mounted in the passage for the cooling air to flow through, the heat exchanger having a conduit with an inlet pen for communicating a liquid to be cooled by the cooling air into the heat exchanger, an outlet port for communicating the liquid out of the heat exchanger, and a path extending from the inlet port to the outlet port for directing the liquid through the heat exchanger, the heat exchanger also having a plurality of fins for transferring heat from the conduit to the cooling air flowing through the heat exchanger, and the fins being aligned in a direction of flow of the cooling air;
   a pulsed-jet array mounted in the passage upstream from the heat exchanger and having a plurality of pulsed-jet actuators for producing pulsed-jets into the cooling air that impart an unsteady component of velocity to the flow of the cooling air for enhancing heat transfer in the heat exchanger, the pulsed-jet array extending across and between sidewalls of the passage; and
   at least one wall-mounted pulsed-jet actuator mounted to a sidewall of the passage upstream from the pulsed-jet array.

9. A system according to claim 8, wherein the pulsed-jet array is located in a plane perpendicular to a direction of the flow of the cooling air as the cooling air flows through the pulsed-jet array.

10. A system according to claim 8, wherein the pulsed-jet array is mounted to the heat exchanger across a cooling air inlet surface of the heat exchanger.

11. A system according to claim 8, wherein the pulsed-jets are emitted in a same direction of flow as the cooling air.

12. A system according to claim 8, wherein the pulsed-jets are emitted in a direction that is perpendicular to a direction of flow of the cooling air.

13. A system according to claim 8, wherein each of the pulsed-jet actuators comprises an enclosure, an orifice, and a vibrating diaphragm for moving the cooling air into and out of the orifice to produce the pulsed-jets.

14. A system for boosting heat transfer capability of cooling air directed into an aircraft, comprising:
   a passage adapted to be located in the aircraft for directing cooling air therethrough, the passage having a ram air inlet for ingress of the cooling air in response to forward flight of the aircraft, and an exit for egress of the cooling air;
   a heat exchanger mounted in the passage for the cooling air to flow through, the heat exchanger having a conduit with an inlet port for communicating a liquid to be cooled by the cooling air into the heat exchanger, an outlet port for communicating the liquid out of the heat exchanger, and a path extending from the inlet port to the outlet port for directing the liquid through the heat exchanger, the heat exchanger also having a plurality of fins for transferring heat from the conduit to the cooling air flowing through the heat exchanger, and the fins being aligned in a direction of flow of the cooling air;
   a pulsed-jet array mounted in the passage upstream from the heat exchanger and having a plurality of pulsed-jet actuators for producing pulsed-jets into the cooling air that impart an unsteady component of velocity to the flow of the cooling air for enhancing heat transfer in the heat exchanger, the pulsed-jet array extending across and between sidewalls of the passage; and
   an interior pulsed-jet actuator located within an interior of the heat exchanger downstream from the pulsed-jet array.

15. A system for boosting heat transfer capability of a heat exchanger, comprising:
   a passage for directing a first working fluid therethrough, the passage having a ram air inlet for ingress of the first working fluid and a flush screened exit for egress of the first working fluid;
   a heat exchanger mounted in the passage, the heat exchanger having a conduit with an inlet port for communicating a second working fluid, comprising a liquid, into the heat exchanger, an outlet port for communicating the second working fluid out of the heat exchanger, and a path extending from the inlet port to the outlet port for directing the second working fluid through the heat exchanger, the heat exchanger also having a plurality of fins for transferring heat from the conduit, and the fins being aligned in a direction of flow of the first working fluid;
   a pulsed-jet array mounted in the passage upstream from the heat exchanger and having a plurality of pulsed-jets for producing pulsed-jets of the first working fluid that impart an unsteady component of velocity to the first working fluid, the pulsed-jets being directed at the heat exchanger for rapidly enhancing a rate of heat transfer and removal in the heat exchanger;
   wherein at least some of the pulsed-jets are mounted in struts located in the passage, and
   at least some of struts are configured as ejectors having inner strut housings that contain the pulsed-jets, and outer strut housings spaced apart from the inner strut housings for permitting flow of the working fluid between the inner and outer strut housings to the pulsed-jets.

16. An aircraft having a system for boosting heat transfer capability of a heat exchanger, comprising:
   a passage within the aircraft having a ram air inlet for ingress of the ram air occurring in response to forward motion of the aircraft and an exit for egress of the ram air;
   a heat exchanger mounted in the passage, the heat exchanger having a conduit with an inlet port for communicating a liquid to be cooled by the ram air into the heat exchanger, an outlet port for communicating the liquid out of the heat exchanger, and a path extending from the inlet port to the outlet port for directing the liquid through the heat exchanger, the heat exchanger also having a plurality of fins for transferring heat from the conduit, and the fins being aligned in a direction of flow of the ram air;
   a plurality of pulsed-jet actuators for producing pulsed-jets of the ram air that impart an unsteady component of velocity to the ram air;
   at least some of the pulsed-jet actuators being mounted in an array extending across the passage at an inlet surface of the heat exchanger;
   at least some of the pulsed-jet actuators being mounted to a sidewall of the passage upstream from the pulsed-jet actuators in the array; and wherein each of the pulsed-jet actuators comprises an enclosure, an orifice, and a vibrating diaphragm for moving the ram air into and out of the orifice to produce the pulsed-jets.

17. An aircraft according to claim 16, wherein at least one of the pulsed-jet actuators is mounted within an interior of the heat exchanger downstream from the inlet surface.

18. An aircraft according to claim 16, further comprising:
a strut extending across the passage upstream from the heat exchanger; and wherein
at least one of the pulsed-jet actuator is mounted to the strut.

19. An aircraft according to claim 16, wherein the pulsed-jets are emitted in a same direction of flow as the ram air.

20. An aircraft according to claim 16, wherein the pulsed-jets are emitted in a direction that is perpendicular to the direction of flow of the ram air.

21. An aircraft according to claim 16, further comprising:
a plurality of struts located in the passage, and at least some of struts being configured as ejectors having inner strut housings and outer strut housings spaced apart from the inner strut housings for permitting flow of the ram air between the inner and outer strut housing; and
at least one of the pulsed-jet actuators is mounted to the inner strut housing.

\* \* \* \* \*